(12) United States Patent
Xu et al.

(10) Patent No.: US 8,458,571 B2
(45) Date of Patent: Jun. 4, 2013

(54) DATA TRANSMISSION METHOD AND EQUIPMENT

(75) Inventors: Jin Xu, Shenzhen (CN); Yuanli Fang, Shenzhen (CN); Zhifeng Yuan, Shenzhen (CN); Song Li, Shenzhen (CN); Jun Xu, Shenzhen (CN); Liujun Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 428 days.

(21) Appl. No.: 12/812,091

(22) PCT Filed: Apr. 30, 2008

(86) PCT No.: PCT/CN2008/070860
§ 371 (c)(1),
(2), (4) Date: Jul. 8, 2010

(87) PCT Pub. No.: WO2009/089695
PCT Pub. Date: Jul. 23, 2009

(65) Prior Publication Data
US 2010/0318875 A1 Dec. 16, 2010

(30) Foreign Application Priority Data

Jan. 14, 2008 (CN) .......................... 2008 1 0000690

(51) Int. Cl.
*H03M 13/00* (2006.01)
(52) U.S. Cl.
USPC .......................................... 714/776; 714/752
(58) Field of Classification Search
None
See application file for complete search history.

(56) References Cited

U.S. PATENT DOCUMENTS

| 6,434,191 | B1 | 8/2002 | Agrawal et al. |
| 6,947,448 | B2 * | 9/2005 | Tomita ........................... 370/471 |
| 7,451,381 | B2 * | 11/2008 | Miller et al. ................... 714/774 |
| 8,037,392 | B1 * | 10/2011 | Sahar ............................. 714/776 |
| 8,046,668 | B2 * | 10/2011 | Rhee et al. ..................... 714/776 |
| 2003/0123409 | A1 * | 7/2003 | Kwak et al. .................... 370/335 |
| 2006/0206779 | A1 * | 9/2006 | Wehn et al. .................... 714/758 |
| 2008/0098273 | A1 * | 4/2008 | Blankenship et al. ......... 714/746 |

FOREIGN PATENT DOCUMENTS

| CN | 1604570 A | 4/2005 |
| CN | 1788446 A | 6/2006 |
| JP | 2003087225 A | 3/2003 |

OTHER PUBLICATIONS

Pro-MPEG Code of Practice #3 release 2. Transmission of Professional MPEG-2 Transport Streams over IP Networks. Pro-MPEG Forum, Jul. 2004.*

* cited by examiner

*Primary Examiner* — Steve Nguyen
(74) *Attorney, Agent, or Firm* — McClure, Qualey & Rodack, LLP

(57) ABSTRACT

The present invention discloses a data transmission method and apparatus. The method comprises: segmenting data to be transmitted into information file segments with a length of Tb bits; performing forward error correction (FEC) coding for Tb information bit sequences composed of bits in same positions in a plurality of continuous information file segments to generate Tb check bit sequences, putting each bit of the check bit sequences in the same position in the check file segments as the corresponding information bit sequences; and transmitting each of the information file segments and check file segments according to their order; the number of bits contained in the information bit sequences being less than or equal to the maximum length of $K_{max}$ bits of the FEC-coded information bit sequences.

10 Claims, 4 Drawing Sheets

DATA TRANSMISSION METHOD AND EQUIPMENT

CROSS REFERENCE RELATED APPLICATIONS

This application is a national phase of PCT/CN2008/070860 filed Apr. 30, 2008 which claims priority to China Application Serial No. 200810000690.5, filed Jan. 14, 2008, both of which are entirely incorporated herein by reference.

TECHNICAL FIELD

The present invention relates to a data transmission method and apparatus.

TECHNICAL BACKGROUND

Data is segmented into packets for transmission on a network/communication channel. In order to improve reliability of data transmission, it is generally required to provide error correction mechanism using network protocol or coding. For example, when data is transmitted over Internet, error detection retransmission mechanism provided by Transmission Control Protocol (TCP) is required to be used to transmit the data reliably, that is, notify a transmitter to make a retransmission when packet loss is detected.

However, when data is transmitted in a multimedia broadcast channel, because a one-way channel is used and the data is transmitted in a one-to-many broadcast/multicast mode, a receiver is not allowed to feed back packet loss and error information to a transmitter such that the error detection retransmission mechanism can not be used. In such case, a packet is required to be forward error correction (FEC)-coded before sent. The classical application layer FEC includes Reed-Solomon (RS) codes and digital Fountain codes. The RS codes are of higher coding and decoding complexity so as merely to be applied to shorter code length typically. Luby Transform (LT) codes and Raptor codes are two types of practically applicable digital Fountain codes. The LT codes have linear coding and decoding time, which is an essential improvement in relation to the RS codes; while the Raptor codes have higher decoding efficiency due to the use of precoding technology. Both multimedia broadcast/multicast service (MBMS) and digital video broadcasting (DVB) in the 3$^{rd}$ Generation Partnership Project (3GPP) use the Raptor codes of the Digital Fountain Company as their FEC coding scheme.

If the first K bits of a coded code word are the same as information bits, then the code is called a system code. The coding process is a process in which a N-bit code length is formed from K information bits, and the purpose of error detection and error correction is achieved by adding N-K check bits. The LT codes do not support the coding mode of system codes, thus, it is difficult to satisfy certain actual FEC coding requirements; the Raptor codes support the system codes, but they need a separate pre-coding process, i.e., a pre-coding matrix, thus, the coding complexity is pretty high.

Low density generator matrix code (LDGC) is introduced due to disadvantages of the above coding mode. The LDGC is a linear packet code and non-zero elements in its generator matrix (coding matrix) are usually sparse; meanwhile, the LDGC is a system code.

FIG. 1 is a schematic diagram of a generator matrix of the LDGC. As shown in FIG. 1, a square matrix corresponding to the first L rows in the generator matrix $G_{ldgc}$ of the LDGC is typically an upper or lower triangular matrix, inversion of which may be done with an iterative method, where, x and y in FIG. 1 may be 0.

FIG. 2 is a schematic diagram of performing a corresponding erase operation on the generator matrix of the LDGC based on erase situation of the received code word when decoded.

As shown in FIG. 2, if errors occur when data is transmitted (i.e., the data is erased), a receiver performs the corresponding erase operation on the generator matrix $G_{ldgc}$ before using $G_{ldgc}$ to decode. That is, assuming that symbols $\{r_i, r_{i+1}, \ldots, r_{i+X1}\}$ and $\{r_j, r_{j+1}, \ldots, r_{j+X2}\}$ in a sequence R ($r_0, r_1, \ldots r_{N-1}$) with a length of N bits are erased by a channel, then rows $\{i, i+1, \ldots i+X1\}$ and $\{j, j+1, \ldots j+X2\}$ in $G_{ldgc}$ are also required to be erased to obtain an erase generator matrix $G_e$. It is noted that $G_e$ is same for the same data loss/error situation.

In prior art, when data is transmitted using the FEC coding and decoding mode, such as LDGC, a transmitter FEC-codes packets, and a receiver generates a corresponding erase generator matrix $G_e$ according to transmission situation for each packet and decodes the packet using $G_e$. The efficiency of such data transmission method is rather low, and decoding cannot be performed effectively when there are too many erroneous data in the packet such that the entire packet has to be discarded, thereby decreasing greatly the transmission efficiency of the data when network/channel works poorly.

SUMMARY OF THE INVENTION

A technical problem to be solved by the present invention is to provide a data transmission method and apparatus able to improve data transmission efficiency and accelerate processing speed of data decoding in order to overcome deficiencies in prior art.

In order to solve the technical problem described above, the present invention provides a data transmission method comprising the following steps of:

A. segmenting data to be transmitted into information file segments with a length of Tb bits;

B. performing forward error correction (FEC) coding for Tb information bit sequences composed of bits in same positions in a plurality of continuous information file segments to generate Tb check bit sequences, generating check file segments with a length of Tb bits based on the Tb check bit sequences, and putting each bit of the check bit sequences according to the order thereof in the same position in the check file segments as the corresponding information bit sequences; and C. transmitting each of the information file segments and check file segments according to their order, and wherein the number of bits contained in the information bit sequences is less than or equal to the maximum length of $K_{max}$ bits of the FEC-coded information bit sequences.

Further, the method has the following characteristics: in the step B, the j$^{th}$ bit of the i$^{th}$ check bit sequence is put in the i$^{th}$ bit position of the j$^{th}$ check file segment, and the i$^{th}$ information bit sequence is composed of the i$^{th}$ bits in the plurality of continuous information file segments according to their order, where i=1, . . . , Tb.

Further, the method has the following characteristics: in the step C, the information file segments and check file segments are packaged in a transmission packet and transmitted, and a header of the transmission packet contains file segment serial numbers, which are serial numbers of the information file segments or check file segments.

Further, the method has the following characteristics: the data to be transmitted is divided into Z file blocks with each file block containing a plurality of continuous information file segments in the following manner:

a) calculate the total number $K_t$ of the information file segments contained in the data to be transmitted based on a length of F bytes of the data to be transmitted: $K_t=\lceil F/T \rceil$;

b) calculate the total number Z of the file blocks: $Z=\lceil K_t/K_{max} \rceil$; and c) if $K_t/K_{max}$ is an integer, then each file block contains $K_{max}$ information file segments;

in the step B, FEC coding is performed for the plurality of information file segments contained in one file block to generate the check file segments of the file block, where T=Tb/8 and $\lceil \bullet \rceil$ represents rounding up.

Further, the method has the following characteristics: if $K_t/K_{max}$ is not an integer, the number of the information file segments contained in each file block is calculated in the following manner:

d) include $K_L=\lceil K_t/Z \rceil$ information file segments into $Z_L$ file blocks and include $K_S=\lfloor K_t/Z \rfloor$ information file segments into $Z_S$ file blocks; and calculate $Z_L$ and $Z_S$ according to the following formulae:

if $K_L>K_S$, then $Z_L=(K_t-K_S\times Z)/(K_L-K_S)$, if $K_L=K_S$, then $Z_L=Z$; $Z_s=Z-Z_L$ and $\lfloor \bullet \rfloor$ represents rounding down.

Further, the method has the following characteristics: the transmission packet contains one or more information file segments or check file segments.

Further, the method has the following characteristics: the FEC coding uses system codes.

Further, the method has the following characteristics: the FEC coding uses low density generator matrix codes (LDGC).

Further, the method has the following characteristics: the header of the transmission packet includes a resource identifier for identifying the data to be transmitted and an update serial number for identifying version information of the data to be transmitted.

The present invention also provides a data transmission apparatus comprising a packet packaging and transmitting unit, a data segmenting unit, a memory and an FEC coding unit, wherein:

the data segmenting unit is used for segmenting data to be transmitted into information file segments with a length of Tb bits and storing the information file segments into the memory according to the order thereof;

the FEC coding unit is used for performing forward error correction-coding for Tb information bit sequences composed of bits in same positions in a plurality of continuous information file segments to generate Tb check bit sequences, generating check file segments with a length of Tb bits based on the Tb check bit sequences, and putting each bit of the check bit sequences according to the order thereof in the same position in the check file segments as the corresponding information bit sequences, where the check file segments are stored in the memory; and the packet packaging and transmitting unit is used for transmitting each of the information file segments and check file segments in the memory according to their order;

and wherein the number of bits contained in the information bit sequences is less than or equal to the maximum length of $K_{max}$ bits in the FEC-coded information bit sequences.

Further, the apparatus has the following characteristics: the FEC coding unit puts the $j^{th}$ bit of the $i^{th}$ check bit sequence in the $i^{th}$ bit position of the $j^{th}$ check file segment, and the $i^{th}$ information bit sequence is composed of the $i^{th}$ bits in the plurality of continuous information file segments according to their order, where i=1, ..., Tb.

Further, the apparatus has the following characteristics: the apparatus further comprises a parameter setting unit, wherein the parameter setting unit is used for calculating the total number $K_t$ of the information file segments contained in the data to be transmitted based on a length of F bytes of the data to be transmitted: $K_t=\lceil F/T \rceil$, and calculating the total number Z of the file blocks: $Z=\lceil K_t/K_{max} \rceil$; wherein if $K_t/K_{max}$ is an integer, then each file block contains $K_{max}$ information file segments; and the FEC coding unit performs the FEC coding for the $K_{max}$ information file segments in the same file block based on the number of the information file segments contained in the file blocks output by the parameter setting unit, to generate the check file segments of the file block, where T=Tb/8 and $\lceil \bullet \rceil$ represents rounding up.

Further, the apparatus has the following characteristics: if $K_t/K_{max}$ is not an integer, the parameter setting unit sets the number of the information file segments contained in $Z_L$ file blocks to be $K_L=\lceil K_t/Z \rceil$ and sets the number of the information file segments contained in $Z_S$ file blocks to be $K_S=\lfloor K_t/Z \rfloor$;

wherein if $K_L>K_S$, then $Z_L=(K_t-K_S\times Z)/(K_L-K_S)$, if $K_L=K_S$, then $Z_L=Z$; $Z_s=Z-Z_L$ and $\lfloor \bullet \rfloor$ represents rounding down.

The FEC coding unit performs the FEC coding for $K_L$ or $K_S$ information file segments in the same file block based on the number of the information file segments contained in the file blocks output by the parameter setting unit, to generate the check file segments of the file block.

Further, the apparatus has the following characteristics: the data packaging and transmitting unit packages information file segments and check file segments into a transmission packet and transmits the transmission packet, wherein a header of the transmission packet contains file segment serial numbers, which are serial numbers of the information file segments or check file segments.

Further, the apparatus has the following characteristics: the FEC coding unit performs the FEC coding using system codes.

Further, the apparatus has the following characteristics: the FEC coding unit performs the FEC coding using low density generator matrix codes.

To sum up, using the data transmission method and apparatus in accordance with the present invention, decoding workload at a receiver is decreased greatly. In addition, because the loss of one packet/information file segment will not result in the loss (erasion) of a great deal of information of code word at the receiver, the success rate of decoding and reliability of data transmission are improved greatly.

PREFERRED EMBODIMENTS OF THE INVENTION

The basic idea of the present invention is to segment data into information file segments with a fixed length, FEC-code information bit sequences composed of bits in same position of a plurality of continuous information file segments to generate check file segments, and then package each of the information file segments and the check file segments into a packet for transmission.

The present invention will be described in detail in conjunction with the accompanying drawings and embodiments.

Figures 1, 2:
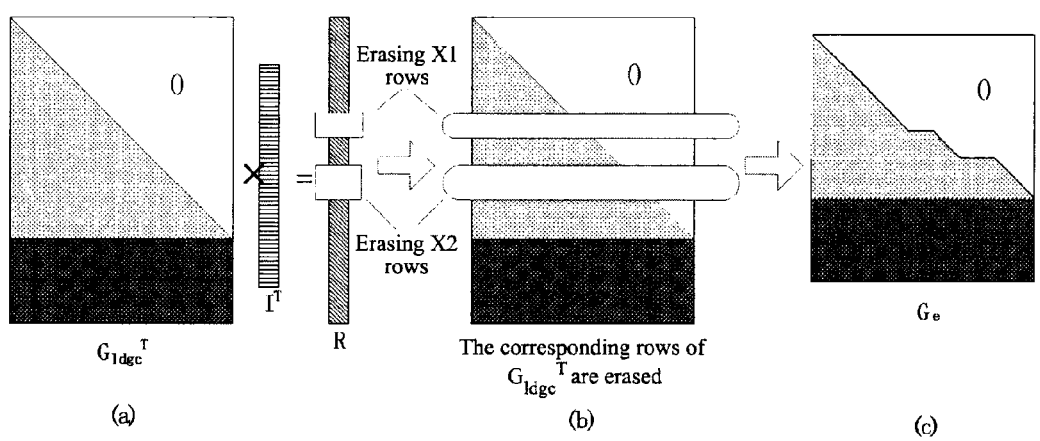
FIG. 1 is a schematic diagram of a generator matrix of the LDGC.
FIG. 2 is a schematic diagram of performing a corresponding erase operation on the generator matrix of the LDGC based on erase situation of the received code word when decoding.
Figure 3:
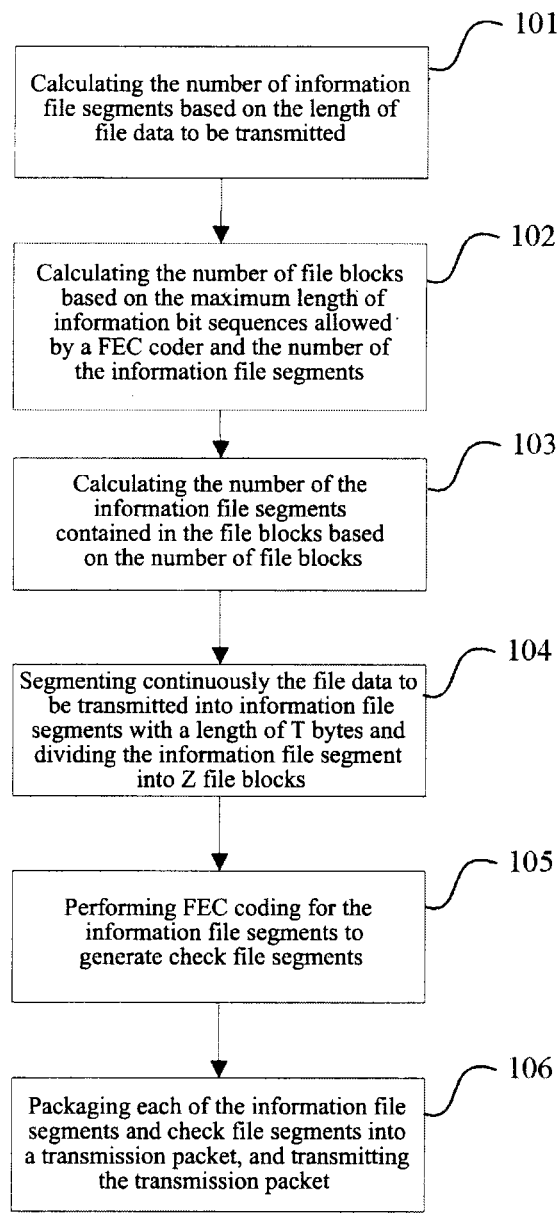
FIG. 3 is a flow chart of a data transmission method in accordance with an embodiment of the present invention.

FIG. 3 is a flow chart of a data transmission method in accordance with an embodiment of the present invention. As shown in FIG. 3, the method comprises the following steps:

101: calculating the number of information file segments based on the length of file data to be transmitted;

If the length of the file data is F bytes and the length of a information file segment is T bytes, then the file data to be transmitted is segmented into $K_t = \lceil F/T \rceil$ information file segments, where $\lceil \bullet \rceil$ represents rounding up operation.

If F/T is not an integer, then the last information file segment is required to be filled.

For example, if F=10240000 bytes and T=512 bytes, then $K_t = \lceil F/T \rceil = \lceil 10240000/512 \rceil = 20000$; i.e., the file data is divided into 20000 information file segments.

102: calculating the number of file blocks based on the maximum length of information bit sequences allowed by a FEC coder and the number of the information file segments;

If the maximum length of information bit sequences allowed by the FEC coder is $K_{max}$, which typically does not exceed 8192 bits, then the number of the file blocks is $Z = \lceil K_t / K_{max} \rceil$.

According to the above example, if $K_{max}$=8000 bits, then the number of the file blocks divided from the file data is $Z = \lceil K_t / K_{max} \rceil = \lceil 20000/8000 \rceil = 3$.

103: calculating the number K of the information file segments contained in each file block based on the number of file blocks;

The file data is divided into $Z = Z_L + Z_S$ file blocks, where for the first $Z_L$ file blocks, each file block contains $K = K_L = \lceil K_t / Z \rceil$ information file blocks called file long blocks; while for the remaining $Z_S$ file blocks, each file block contains $K = K_S = \lfloor K_t / Z \rfloor$ information file blocks called file short blocks, where $\lfloor \bullet \rfloor$ represents rounding down operation.

The above-described $Z_L$ and $Z_S$ are calculated using the following formulae:

If $K_L > K_S$, then $Z_L = (K_t - K_S \times Z)/(K_L - K_S)$, if $K_L = K_S$, then $Z_L = Z$; $Z_s = Z - Z_L$.

According to the above example, when $K_t$=20000, $K_L = \lceil K_t / Z \rceil = \lceil 20000/3 \rceil = 6667$ information file segments;
$K_S = \lfloor K_t / Z \rfloor = \lfloor 20000/3 \rfloor = 6666$ information file segments;
$Z_L = (K_t - K_S \times Z)/(K_L - K_S) = (20000 - 6666 \times 3)/(6667 - 6666) = 2$; and
$Z_s = Z - Z_L = 3 - 2 = 1$.

That is, each of the first two file blocks contains 6667 information file segments, and the last file block contains 6666 information file segments.

The main purpose of using such an allocation method for information file segments is to avoid too few information file segments contained in the last file block. In subsequent steps in the present invention, based on the number of information file segments contained in the file blocks, the corresponding number of bits is extracted from the file block for coding. The smaller the coded code word is, the poorer the effect of coding and decoding is. Thus, avoiding a too small quantity of information file segments contained in the file blocks is to avoid too low efficiency of coding and decoding.

Of course, if $K_t/K_{max}$ is an integer (i.e., if $K_t/Z$ is an integer), then each file block contains the same number of information file segments $K = K_{max}$, and distinguishing the file long blocks from the file short blocks is not necessary.

104: segmenting the file data to be transmitted continuously into $K_t$ information file segments with a length of T bytes based on the calculated number $K_t$ of the information file segments, the number Z of the file blocks and the number K of the information file segments contained in the file blocks; and grouping each information file segment according to its order to divide the information file segments into Z file blocks.

If $K_t/K_{max}$ is not an integer, the Z file blocks include $Z_L$ file long blocks and $Z_S$ file short blocks. Each file long block includes $K_L$ information file segments, and each file short block includes $K_S$ information file segments.

In addition, each information file segment in each file block is needed to be allocated a unique file segment index (FSI) in the file block, where the FSI is a positive integer.

For example, the FSI of the first information file segment in a certain file block is 0, the second is 1, and so on.

105: FEC-coding information bit sequences composed of bits in same position of each information file segment in each file block to generate check bit sequences; generating the check file segments with a length of Tb bits based on the check bit sequences, and putting each bit of the check bit sequences in the same position of the check file segments as the corresponding information bit sequences;

An information bit sequence composed of the $j^{th}$ bit in each information file segment in each file block is FEC-coded to generate the $j^{th}$ check bit sequence, and the $m^{th}$ bit in the check bit sequence is put in the position of the $j^{th}$ bit of the $m^{th}$ check file segment in the file block, where j=1, 2, ..., Tb, and m= 1, ..., M, M is the length of the check bit sequence.

The length of the check bit sequence is equal to the number K of the information file segments contained in the file blocks. That is, for the file long blocks, the length of each information bit sequence is $K_L$; and for the file short blocks, the length of each information bit sequence is $K_S$.

For different file blocks, since the length of the information bit sequence may be different, the value of M may also be different.

In addition, each check file segment in each file block is needed to be allocated a unique FSI in the file block, where the FSI is a positive integer. The FSI of the check file segment is closely followed by the FSI of the information file segment, and the FSI of the check file segment is larger than the FSI of the information file segment. For example, the FSI of the information file segment ranges from 1 to K, while the FSI of the check file segment starts from K+1.

Figure 4:
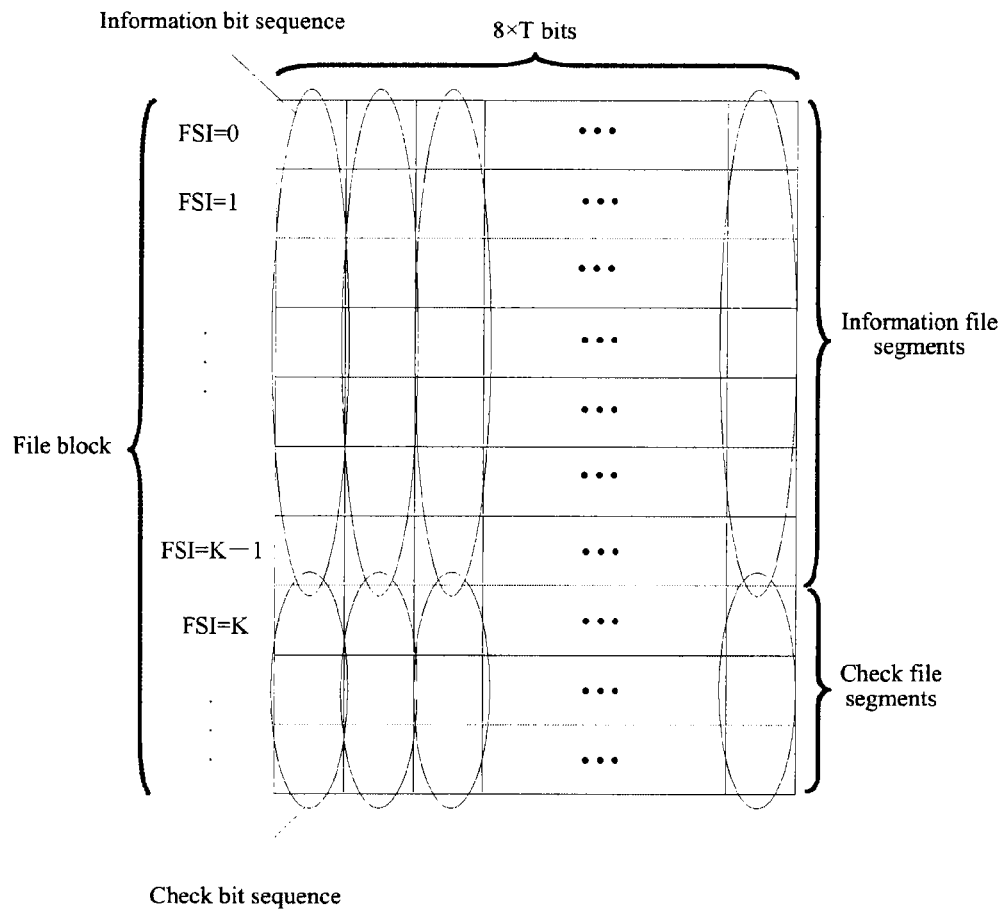
FIG. 4 is a schematic diagram of performing FEC coding for each information file segment in a file block using the method in accordance with an embodiment of the present invention.

FIG. 4 is a schematic diagram of performing FEC-coding for each information file segment in a file block using the method in accordance with an embodiment of the present invention As shown in FIG. 4, the file block includes a plurality of information file segments and check file segments. Each information file segments contains Tb=8×T bits and information bit sequences are composed of bits in the same position of each information file segment. Each information bit sequence is FEC-coded to generate a check bit sequence.

Thus, each file block includes 8×T information bit sequences and check bit sequences. The length of an information bit sequence is K bits, and if $K_t/K_{max}$ is not an integer, $K=K_L$ or $K_S$. The length of the check bit sequence is associated with the length of the information bit sequence and FEC coding algorithm.

In this embodiment, the FEC coding algorithm uses system codes, such as LDGC. That is, for the information bit sequence with a length of K bits, the first K bits of the coded and generated code word is the same as the information bit sequence, while a sequence composed of the subsequent bits of the code word is called a check bit sequence.

That is, one code word is composed of one information bit sequence and one check bit sequence.

106: After each bit of the information file segments in the file blocks is coded, packaging each of the information file segments and check file segments into a transmission packet for transmission according to their order.

Figure 5:
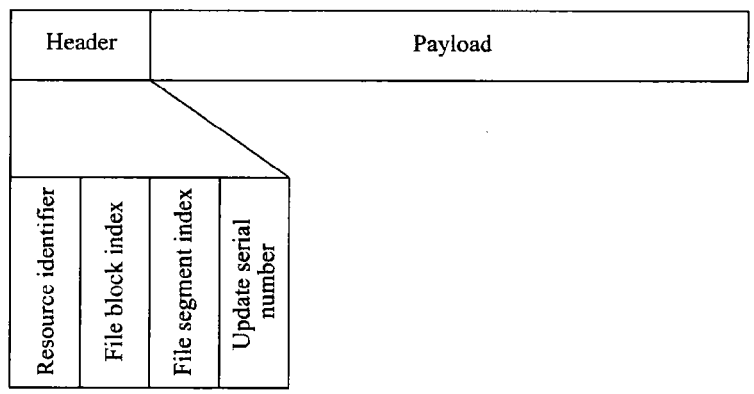
FIG. 5 is a block diagram of a transmission packet in accordance with the present invention.

FIG. 5 is a block diagram of a transmission packet in accordance with the present invention. As shown in FIG. 5, the transmission packet is composed of a header (HDR) and a payload.

The header includes a resource identifier, a file block index (FBI), a file segment index (FSI) and an update serial number.

The resource identifier is used for identifying file/resource which data (the information file segment or the check file segment) transmitted in the transmission packet belongs to.

The file block index is an index for identifying the file block which data (the information file segment or the check file segment) transmitted in the transmission packet belongs to.

The file segment index is a serial number of the information file segment or the check file segment transmitted in the transmission packet.

The update serial number is a version number of file/resource which data (the information file segment or the check file segment) transmitted in the transmission packet belongs to.

If one transmission packet includes a plurality of file segments, then a file segment index field is a FSI of the first file segment contained in the transmission packet.

The transmission packet is divided into an information transmission packet and a check transmission packet.

There are only information file segments in the payload portion of the information transmission packet; and there are only check file segments in the payload portion of the check transmission packet. Thus, the FSI of the information transmission packet should be less than K, or $K_L$ (for the file long blocks), or $K_S$ (for the file short blocks); the FSI of the check transmission packet should be larger than or equal to K, or $K_L$ (for the file long blocks), or $K_S$ (for the file short blocks)

The payload portion of each transmission packet may contain G file segments, and the size of G is determined by the following formula:

$$G=\min\{P/T, G_{max}\}$$

where P is the size of the payload of the maximum transmission packet and $G_{max}$ is the maximum number of the file segments allowed in the transmission packet.

For example, if P=512 is the size of the payload of the maximum transmission packet and $G_{max}=10$ is the maximum number of the file segments allowed in the transmission packet, then the payload portion of the transmission packet contains $G=\min\{P/T, G_{max}\}=\min\{1,10\}=1$ file segment.

The payload portion of the transmission packet may also include a plurality of file segments, i.e., the size of T may change according to the size of P.

To sum up, the present invention segments file data into information file segments with the same size, then groups information file segments into a plurality of file blocks, and FEC-codes each bit in the same position of the information file segments grouped in the same file block. Thus, in a transmission process, the loss (erase) of any one of the information file segments only affects one bit of a code word used by a receiver in decoding, and for 8×T code words, the same row erasing and matrix inversion operation may be performed in a decoding matrix (e.g., a generator matrix of LDGC) used in decoding, thereby decreasing greatly decoding workload at the receiver. Meanwhile, because the loss of one information file segment will not cause the loss (erase) of a lot of information of the code word at the receiver, the success rate of decoding and reliability of data transmission are improved greatly.

Many variations may be made to the above-described embodiments according to the basic principle of the present invention. Some examples will be described as follows.

(1) In the embodiment described above, one information bit sequence includes one bit in one file segment.

In another embodiment, one information bit sequence may include a plurality of adjacent bits in one file segment. In such case, if one file segment is lost in the transmission process, a number of bits will be lost (erased) in the code word received at the receiver, which affects the success rate of decoding.

(2) In addition to LDGC, the FEC coding method in accordance with the present invention may also use other system codes, such as Raptor codes.

(3) In the embodiments described above, the number of file segments contained in the file blocks is predetermined according to the maximum length of the information bit sequence allowed by a FEC encoder and the number of the information file segments (the size of file data).

In another embodiment, the number of file segments contained in the file blocks may be adjusted dynamically according to some factors, such as channel quality, and certainly can not exceed the maximum length of the information bit sequence allowed by the FEC coder. In such case, the receiver can calculate the number of the file segments (including the information file segments and the check file segments) contained in one file block according to the file block index in the transmission packet, and further calculate the number of the information file segments and the number of the check file segments. A file segment quantity field may also be added to the header of the transmission packet. Of course, this will increase complexity of decoding to some extent.

(4) In the embodiment described above, the file segments are packaged into the transmission packet for transmission.

In another embodiment, for streaming media application in a broadcast channel, each field in the header is an optional field and a fixed number of file segments are packaged into a packet in link layer for transmission; the receiver identifies and receives each file segment depending on link layer protocol. Of course, in such case, the code word length for each FEC coding is a fixed value predetermined by a transmitter and receiver.

Figure 6:
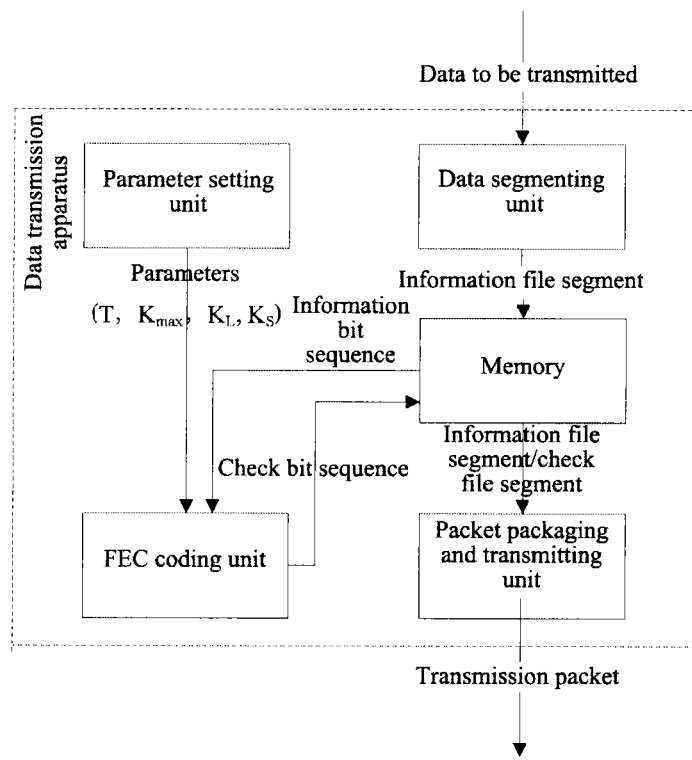
FIG. 6 is a block diagram of a data transmission apparatus in accordance with the present invention.

FIG. 6 is a block diagram of a data transmission apparatus in accordance with an embodiment of the present invention. As shown in FIG. 6, the apparatus includes a parameter setting unit, a data segmenting unit, a memory, an FEC coding unit and a packet packaging and transmitting unit, wherein, the parameter setting unit is configured to calculate the total number $K_t$ of information file segments, the total number Z (or $Z_L$ and $Z_S$) of file blocks and the number $K_{max}$ (or $K_L$ and $K_S$) of the information file segments contained in the file blocks based on the byte length F of data to be transmitted. The specific calculation method is described above;

the data segmenting unit is configured to segment the data to be transmitted into the information file segments with a length of Tb=8×T bits and store each file segments into the memory in order;

the FEC coding unit is configured to FEC-code Tb information bit sequences composed of bits in same position in a plurality of continuous information file segments in the memory to generate Tb check bit sequences, put each bit of the check bit sequences in the same position of the check file segments as the corresponding information bit sequences, and store the check file segments into the memory;

Preferably, the FEC coding unit performs FEC-coding for the $i^{th}$ information bit sequence of one file block stored in the memory to generate the $i^{th}$ check bit sequence based on parameters (T, $K_{max}$, or $K_L$ and $K_S$) output by the parameter setting unit, and puts the $j^{th}$ bit of the $i^{th}$ check bit sequence in the $i^{th}$ bit position of the $j^{th}$ check file segment of the file block, where i=1, ..., Tb.

Where, one file block is composed of $K_{max}$ (or $K_L$ and $K_S$) continuous information file segments.

The $i^{th}$ information bit sequence is composed of the $i^{th}$ bit of each information file segment in the file blocks according to their order.

Preferably, the FEC coding unit performs FEC coding using system codes, especially LDGC.

the packet packaging and transmitting unit is configured to transmit each of the information file segments and check file segments in the memory according to their order.

Preferably, the packet packaging and transmitting unit is configured to package information file segments and check file segments into a transmission packet and transmit the transmission packet. The header of the transmission package includes a file segment serial number, a resource identifier for identifying the data to be transmitted and an update serial number for identifying version information of the data to be transmitted. The transmission packet includes one information file segment or check file segment.

INDUSTRIAL APPLICABILITY

To sum up, the present invention segments file data into information file segments with the same size, then groups information file segments into a plurality of file blocks, and FEC-codes each bit in the same position of the information file segments grouped in the same file block. Thus, in a transmission process, the loss (erasion) of any one of the information file segments only affects one bit of a code word used by a receiver in decoding, and for 8×T code words, the same row erasing and matrix inversion operation may be performed in a decoding matrix (e.g., a generator matrix of LDGC) used in decoding, thereby decreasing greatly decoding workload at the receiver. Meanwhile, because the loss of one information file segment will not cause the loss (erasion) of a lot of information of the code word at the receiver, the success rate of decoding and reliability of data transmission are improved greatly.

What is claimed is:

1. A data transmission method comprising the following steps of:
  A. segmenting data to be transmitted into information file segments with a length of Tb bits;
  B. performing forward error correction (FEC) coding for Tb information bit sequences composed of bits in same positions in a plurality of continuous information file segments to generate Tb check bit sequences, generating check file segments with a length of Tb bits based on the Tb check bit sequences, and putting each bit of the check bit sequences in the same position in the check file segments as the corresponding information bit sequences; and
  C. transmitting each of the information file segments and check file segments, and wherein
  the number of bits contained in the information bit sequences is less than or equal to the maximum length of $K_{max}$ bits of the FEC-coded information bit sequences;
  wherein in the step B, the operation of putting each bit of the check bit sequences in the same position in the check file segments as the corresponding information bit sequences comprises: putting a $j^{th}$ bit of a $i^{th}$ check bit sequence in a $j^{th}$ bit position of a $j^{th}$ check file segment, and a $i^{th}$ information bit sequence is composed of the $i^{th}$ bits in the plurality of continuous information file segments, where i=1, ..., Tb;
  wherein in the step C, the information file segments and check file segments are packaged in a transmission packet and transmitted, and a header of the transmission packet contains file segment serial numbers, which are serial numbers of the information file segments or check file segments; and
  wherein, the data to be transmitted is divided into Z file blocks with each file block containing a plurality of continuous information file segments in the following manner:
  a) calculating the total number $K_t$ of the information file segments contained in the data to be transmitted based on a length of F bytes of the data to be transmitted: $K_t = \lceil F/T \rceil$;
  b) calculating the total number Z of the file blocks: $Z = \lceil K_t/K_{max} \rceil$; and
  c) if $K_t/K_{max}$ is an integer, then containing, in each file block, $K_{max}$, information file segments; and
  in the step B, performing the FEC coding for the plurality of information file segments contained in one file block to generate the check file segments of the file block, where T=Tb/8 and $\lceil \bullet \rceil$ represents rounding up.

2. The data transmission method according to claim 1, wherein if $K_t/K_{max}$ is not an integer, the number of the information file segments contained in each file block is calculated in the following manner:
  d) include $K_L = \lceil K_t/Z \rceil$ information file segments into $Z_L$ file blocks and include $K_S = \lfloor K_t/Z \rfloor$ information file segments into $Z_S$ file blocks; and
  calculate $Z_L$ and $Z_S$ according to the following formulae:
  if $K_L > K_S$, then $Z_L = (K_t - K_S \times Z)/(K_L - K_S)$, if $K_L = K_S$, then $Z_L = Z$; $Z_s = Z - Z_L$ and $\lfloor \bullet \rfloor$ represents rounding down.

3. The data transmission method according to claim 1, wherein the FEC coding uses system codes.

4. The data transmission method according to claim 3, wherein the FEC coding uses low density generator matrix codes (LDGC).

5. The data transmission method according to claim 1, wherein the header of the transmission packet includes a resource identifier for identifying the data to be transmitted and an update serial number for identifying version information of the data to be transmitted.

6. A data transmission apparatus comprising a packet packaging and transmitting unit, a data segmenting unit, a memory and a forward error correction (FEC) coding unit, wherein:
  the data segmenting unit is used for segmenting data to be transmitted into information file segments with a length of Tb bits and storing the information file segments into the memory;
  the FEC coding unit is used for performing FEC coding for Tb information bit sequences composed of bits in same positions in a plurality of continuous information file segments to generate Tb check bit sequences, generating check file segments with a length of Tb bits based on the Tb check bit sequences, and putting each bit of the check bit sequences according to the order thereof in the same position in the check file segments as the corresponding information bit sequences, where the check file segments are stored in the memory; and the packet packaging and transmitting unit is used for transmitting each of the information file segments and check file segments in the memory;

and wherein the number of bits contained in the information bit sequences is less than or equal to the maximum length of $K_{max}$ bits in the FEC-coded information bit sequences;

wherein, the FEC coding unit putting each bit of the check bit sequences in the same position in the check file segments as the corresponding information bit sequences comprises: the FEC coding unit putting a $j^{th}$ bit of a $i^{th}$ check bit sequence in a $i^{th}$ bit position of a $j^{th}$ check file segment; the $i^{th}$ information bit sequence is composed of the $i^{th}$ bits in the plurality of continuous information file segments, where i=1, ..., Tb; and wherein, the parameter setting unit is used for calculating the total number $K_t$ of the information file segments contained in the data to be transmitted based on a length of F bytes of the data to be transmitted: $K_t=\lceil F/T \rceil$, and calculating the total number Z of the file blocks: $Z=\lceil K_t/K_{max} \rceil$; wherein if $K_t/K_{max}$ is an integer, then each file block contains $K_{max}$ information file segments; and the FEC coding unit performs the FEC coding for the $K_{max}$ information file segments in the same file block based on the number of the information file segments contained in the file blocks output by the parameter setting unit, to generate the check file segments of the file block;

where T=Tb/8 and $\lceil \bullet \rceil$ represents rounding up.

7. The data transmission apparatus according to claim 6, wherein if $K_t/K_{max}$ is not an integer, the parameter setting unit sets the number of the information file segments contained in $Z_L$ file blocks to be $K_L=\lceil K_t/Z \rceil$ and sets the number of the information file segments contained in $Z_S$ file blocks to be $K_S=\lfloor K_t/Z \rfloor$;

wherein if $K_L > K_S$, then $Z_L=(K_t-K_S \times Z)/(K_L-K_S)$, if $K_L=K_S$, then $Z_L=Z$; $Z_S=Z-Z_L$ and $\lfloor \bullet \rfloor$ represents rounding down;

the FEC coding unit performs the FEC coding for $K_L$ or $K_S$ information file segments in the same file block based on the number of the information file segments contained in the file blocks output by the parameter setting unit, to generate the check file segments of the file block.

8. The data transmission apparatus according to claim 6, wherein the data packaging and transmitting unit packages information file segments and check file segments into a transmission packet and transmits the transmission packet, wherein a header of the transmission packet contains file segment serial numbers, which are serial numbers of the information file segments or check file segments.

9. The data transmission apparatus according to claim 6, wherein the FEC coding unit performs the FEC coding using system codes.

10. The data transmission apparatus according to claim 9, wherein the FEC coding unit performs the forward error correction-coding using low density generator matrix codes (LDGC).

* * * * *